March 24, 1925.
C. W. STOCKTON ET AL
1,531,042
DIRIGIBLE HEADLIGHT MECHANISM
Filed Oct. 22, 1923
2 Sheets-Sheet 2
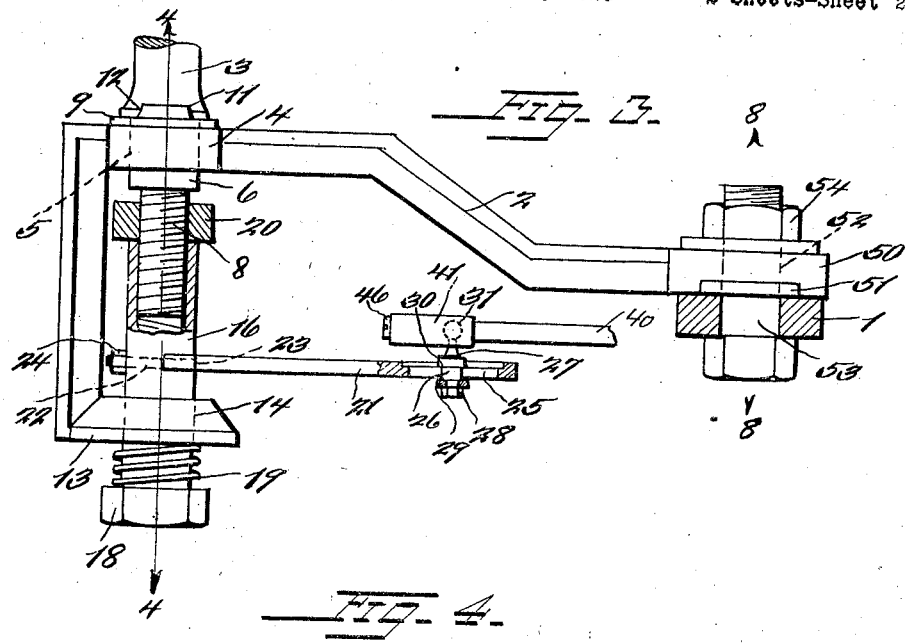
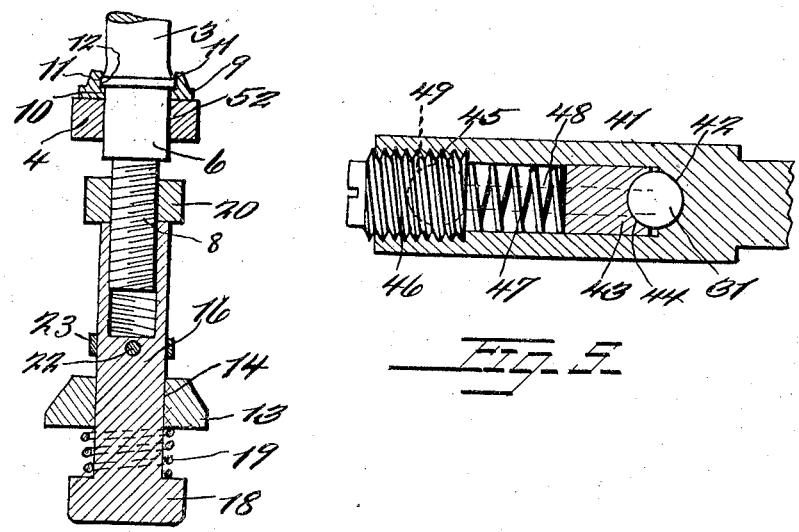
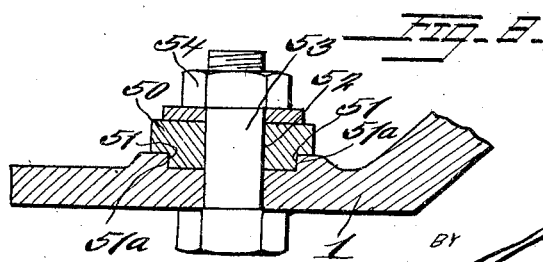
INVENTOR
C. W. Stockton
and G. W. Lard
ATTY.

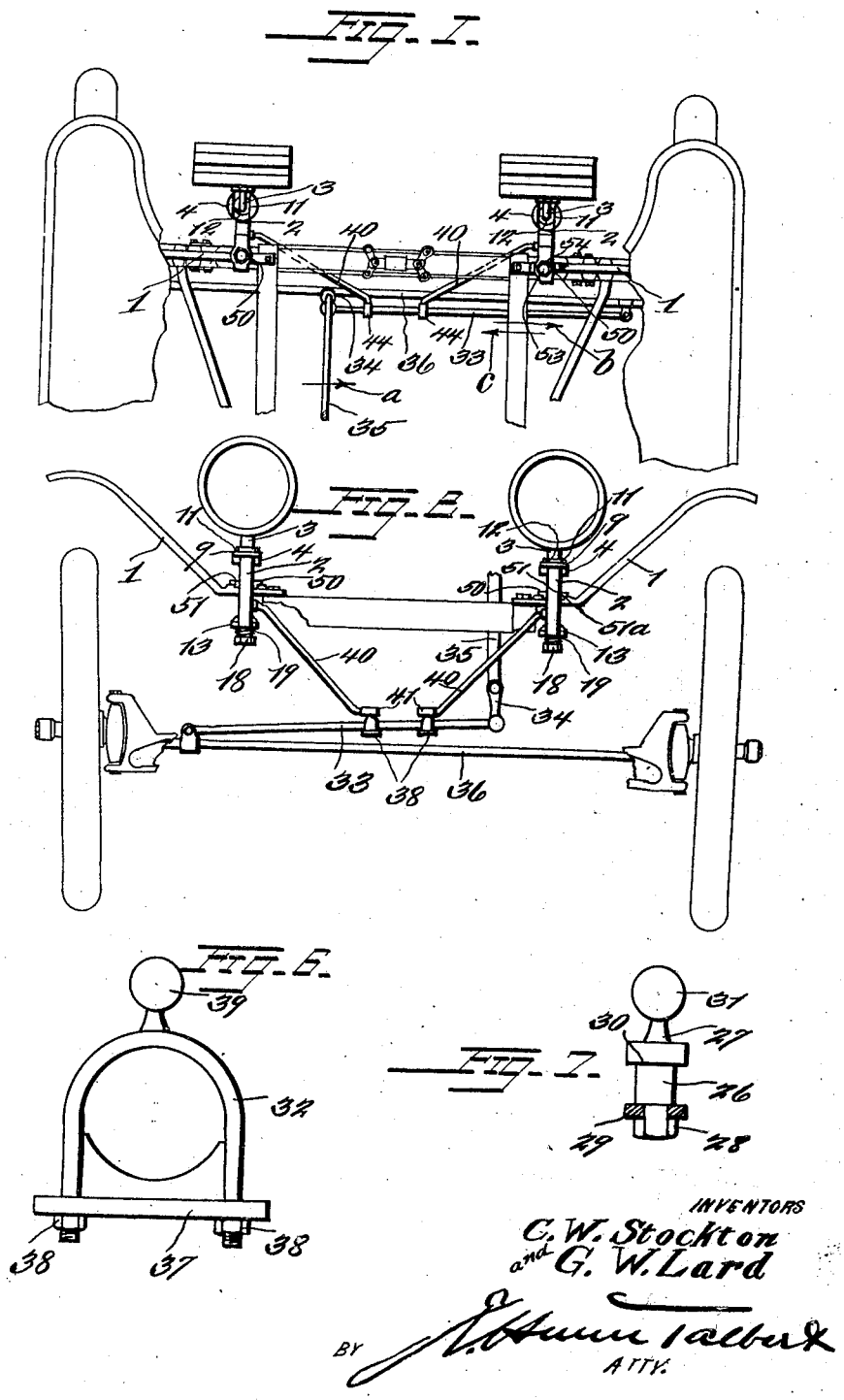

Patented Mar. 24, 1925.

1,531,042

UNITED STATES PATENT OFFICE.

CHARLES W. STOCKTON AND GEORGE W. LARD, OF APACHE, OKLAHOMA.

DIRIGIBLE HEADLIGHT MECHANISM.

Application filed October 22, 1923. Serial No. 670,081.

*To all whom it may concern:*

Be it known that CHARLES W. STOCKTON and GEORGE W. LARD, citizens of the United States, residing at Apache, in the county of Caddo and State of Oklahoma, have invented new and useful Improvements in Dirigible Headlight Mechanism, of which the following is a specification.

The present invention has for its purpose to provide, in a mechanism of this kind, a construction applicable to automobiles of all makes, preferably to the Ford automobile, without changing the construction of the front wheel connecting rods and steering elements and without disturbing other parts of the structure of the vehicle with the exception of positioning the headlights forwardly of the fenders in order to prevent the fenders interrupting the movement of the headlights.

Another purpose is to provide an improved bracket and means of connection to the fender brace for the purpose of supporting the headlight forwardly of the fender to permit freedom of movement.

Still another purpose is to provide improved means for connecting headlight moving rods with arms (which are operatively connected to the headlight posts) and the steering mechanism, whereby the rods may accommodate themselves to the vibrations of the body.

A further purpose is the provision of a headlight mechanism constructed and so arranged and operatively connected with the steering mechanism of the vehicle that when the front wheels are turned to the right or to the left, the headlights correspondingly turn.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a plan view of the forward part of an automobile, showing the front wheel connecting rod and the link connected thereto and which, in turn, operatively connects to the steering shaft, illustrating the improved dirigible headlight mechanism as applied.

Figure 2 is a view in front elevation of an automobile, also showing the headlight mechanism applied.

Figure 3 is an enlarged detail view of one of the brackets which support the headlight forwardly of the fender.

Figure 4 is a sectional view through the bracket.

Figure 5 is an enlarged sectional view through the connections carried by the ends of the links or rods which connect one of the arms of the headlight post and the link which is operated by the steering shaft.

Figure 6 is a detail view of the bracket 32.

Figure 7 is a detail view of the stud 27.

Figure 8 is a sectional view on line 8—8 of Figure 3.

Referring to the drawings, 1 designates the fender braces of the automobile and 2 denotes brackets for the support of the headlight posts 3. Each bracket is angular in general shape and the body in cross section is substantially T-shaped, especially that portion which fastens to the fender brace. The bracket has its upper arm provided with a boss 4 through which an opening 5 is formed to receive the reduced part 6 of the headlight post 3.

The post 3 below the reduced part 6 has a second reduced extension 8 which is exteriorly threaded. The reduced part 6 of the post 3 enters the opening 5 of the boss 4. A washer 9 engages the upper face of the upper portion of the bracket and its opening 10 registers with the opening 5. The upper part of the washer has opposite flat shoulders 11 which engage diametrically opposite flat portions 12 on the lower part of the post 3 so that the washer and the post will rotate together when the headlight is moved in one direction or the other.

The lower part of the bracket 2 terminates in a short arm 13 which is parallel with the part of the bracket which supports the post 3. This arm 13 has a central opening 14 for the reception of a light tubular post 16. The lower end of the tubular post 16 has a head 18, there being a suitable spring 19 interposed between the head and the under face of the arm 13, thereby permitting the post 16 to yield upwardly due to any vibrations of the body of the vehicle.

The light tubular post 16 is threaded to the second reduced extension 8 of the headlight post 3. A lock nut 20 engages the threads of the extension 8, and is designed to tighten against the end of the tubular post 16, thereby locking the post to the extension 8 so that the post 3 and the post 16 will rotate as one body.

An arm 21 is provided for turning the headlight supporting post and, in order to fix the arm 21 to the post 16, an extension 22 projects from the crotch 23 of the arm. The crotch 23 of the arm is arcuate in shape to conform to the cylindrical contour of the post 16. The extension 22 passes transversely through the post 16 and is supplied with a nut 24 on its end. The nut 24 is adapted to be tightened to hold the arm rigidly relative to the post 16.

Obviously, there are two headlights, therefore both are provided with posts 3 and 16 supported by the brackets 2, hence two arms 21 are necessary. Each arm 21 at its extremity is provided with a rabbeted slot 25 through which the shank 26 of a stud 27 engages. The shank is adapted to slide in the slot, there being a nut 28 and a washer 29 below the arm. The flared portion or shoulder 30 of the stud rides in the rabbet of the slot 25. The upper end of the stud terminates in a spherical member or ball 31.

U-shaped clips 32 are carried by the link 33 which connects the arm 34 of the steering shaft 35 with the knuckle connecting rod 36. It is well known that the shifting of this rod 36 oscillates the front wheels of the vehicle to cause the machine to travel in one direction or the other. The clips 32 may be disposed at any suitable location preferably along the rod 33, although it is obvious that the clips may be carried by the connecting rod 36. Each clip straddles the rod 33, there being a transverse plate 37 with extensions to receive the arms of the clip to hold the plate in position. Suitable nuts 38 engage the extensions of the arms of the clip 32 for the purpose of binding the plate 37 tightly against the under surface of the rod 33. The plate 37 has an arcuate edge which conforms to the contour of the rod 33.

The clips 32 at their upper portions terminate in spherical members or balls 39. Connecting rods 40 are provided for connecting the spherical members or balls 31 respectively with the spherical members or balls 39, and in order to permit the dirigible mechanism to accommodate itself to the vibrations or irregular movements of the body of the vehicle, it is necessary to provide a tensioned universal or ball joint for connecting each end of each rod 40 to one of the spherical members or balls. This tensioned universal joint comprises a sleeve 41 constituting an integral part of the rod 40, and the bottom of the sleeve has a spherical seat 42, there being a retaining head 43 (which likewise has a spherical seat 44) for cooperating with the spherical member or ball to retain it in engagement with the seat 42.

The interior of the sleeve 41 adjacent its open end is threaded, as shown at 45, for the reception of a plug or closure 46, there being a coiled spring 47 interposed between the plug 46 and the retaining head 43 to hold the latter constantly in engagement with the ball or spherical member. The wall of the sleeve has an elongated slot 48 which, adjacent the threaded end of the sleeve, terminates in an enlarged opening 49 which permits of the insertion of the spherical member or ball so that the shank which carries the spherical member or ball may enter the slot 48.

After the ball has been inserted through the enlarged opening and the shank engaged with the slot, the spring tensioned retaining head is placed in the sleeve, together with its spring, after which the plug is threaded into position. The ball coacts between the two spherical seats 42 and 44 and, since the shank which carries the ball or spherical member engages through the slot, it is possible for the shank to move in the direction of the spring. This connection allows the rod 33 to freely move without interruption or binding. These connections or joints also permit the rods 40 to properly operate as well as allowing the arms 21 to move freely without binding.

It will be noted that when the steering shaft 35 is rocked in the direction of the arrow $a$, the rod 33 will move in the direction of the arrow $b$, correspondingly shifting the rod 33 which will turn the headlights to the left corresponding with the direction of travel of the front wheels. When the steering shaft 35 is rocked in the reverse direction, the connecting rod or link 33 will move in the direction of the arrow $c$, correspondingly operating the rod 36 and turning the front wheels to the right. Due to the rods 40 being connected to the arms of the headlight posts, the headlights will turn correspondingly in the direction with the wheels.

The bracket 2 has a suitable boss 50 which has opposite shoulders or flat portions 51 which engage corresponding pieces on the fender brace so as to hold the bracket rigid and in such wise as to prevent lateral movement. An opening 52 is formed through the boss, there being a bolt 53 passing through the fender brace, up through the opening 52 and which is supplied with a nut 54 which may be threaded home for tightening the bracket securely in position. Obviously, a washer is disposed between the nut 54 and the upper surface of the bracket 2.

The invention having been set forth, what is claimed is:

An automobile headlight structure comprising a bracket having spaced end portions one of which is longer than the other, and the intermediate portion disposed at a right angle to the end portion, the longer end portion of the bracket having an offset extremity, a portion of which is disposed approximately in alignment with a point lying midway between the ends of the intermediate portion of the bracket, means for attaching the longer end portion to the automobile, a lamp post journaled in the longer end portion of the bracket, said post having a threaded extension which lies between the portions of the bracket, a second post journaled in the shorter end of the bracket and having a threaded socket which receives the extension of the first mentioned post, the second mentioned post being slidably mounted in the second end of the bracket, a spring interposed between the shorter end of the bracket and the lower portion of the second mentioned post being under tension with a tendancy to hold the second mentioned post in a firmer position in the bracket and means for turning the second mentioned post.

In testimony whereof they affix their signatures.

CHARLES W. STOCKTON.
GEORGE W. LARD.